United States Patent [19]

Douglas

[11] 4,052,729
[45] Oct. 4, 1977

[54] CAMERA WITH MOVABLE FILM DRIVE AND OPTICAL UNIT

[75] Inventor: Lawrence M. Douglas, South Easton, Mass.

[73] Assignee: Polaroid Corporation, Cambridge, Mass.

[21] Appl. No.: 720,006

[22] Filed: Sept. 2, 1976

[51] Int. Cl.² ............................................. G03B 17/50
[52] U.S. Cl. ..................................... 354/86; 354/150;
354/219; 354/286; 354/288
[58] Field of Search ................................... 354/83–86,
354/150, 219, 286, 288

[56] References Cited
U.S. PATENT DOCUMENTS

| 3,810,220 | 5/1974 | Paglia | 354/85 X |
| 3,868,709 | 2/1975 | Douglas | 354/86 X |

*Primary Examiner*—John Gonzales
*Attorney, Agent, or Firm*—David R. Thornton

[57] ABSTRACT

A photographic camera of the self-developing type has a movable housing module located along both a film processing path and an optical image path and which supports a photocell, optical elements of both a taking lens and a viewfinder, film processing rollers, and a drive mechanism for the rollers. In a closed position of the module, the processing rollers are spaced from a film cassette in the camera and are aligned, along the film path, with the foremost film unit in the cassette. The optical elements of the closed module are in optical alignment with related optical elements mounted on the camera frame and located between the cassette and rollers. In an open position, the module is clear of a cassette loading path generally coincident with the film processing path; and the rollers, optical elements, drive mechanism and other elements which the module mounts are accessible for inspection and maintenance.

11 Claims, 4 Drawing Figures

4,052,729

CAMERA WITH MOVABLE FILM DRIVE AND OPTICAL UNIT

BACKGROUND OF THE INVENTION

This invention relates to a photographic camera for use with self developing film. More particularly, it provides camera structure for mounting a film processing mechanism and optical components removably located in a film loading path to be readily accessible, while other optical elements proximate to the loaded film are relatively inaccessible.

It is known in the art to initiate the development of an exposed self-developing film unit by directing the film unit to the nip of a pair of processing or spread rollers. The rollers rupture internal pods of photoprocessing composition and spread it over photosensitive layers of the film unit to initiate the development process. The spread rollers typically are motor driven and also discharge the film unit to the user through an exit slot in the camera.

The quality of the final photograph from a camera of this type depends on uniform spreading of the photoprocessing composition, and accordingly the rollers must be clean, properly aligned and not worn. As a result, convenient access to the spread rollers for inspection, cleaning, and repair is important in attaining reliable and long term performance of the camera.

The present invention, which is directed to specific advantageous features of a loading door module of a self-processing camera, has particular utility in a compact rigid non-folding camera. Various other aspects of such a camera are described in the following commonly assigned, co-pending applications filed on even date herewith: "Compact Self-Developing Camera with Folded Optical Image Path" by L. M. Douglas, Ser. No. 720,054; "Selective Closure of Camera Viewfinder and Camera Incorporating Same" by L. M. Douglas, Ser. No. 720,047; "Film Advance Mechanism" by L. M. Douglas, Ser. No. 720,007; and "Compact Prism Camera" by B. K. Johnson, Ser. No. 720,004. In this camera, the exit face of a prism overlies and is closely spaced from the photosensitive surface of the foremost film unit in the cassette.

It is therefore a principal object of this invention to provide an assemblage that mounts the film processing elements and drive arrangement therefor of a self-developing camera in a manner to be readily accessible.

It is another object of the invention to provide an assemblage having the foregoing advantages that spaces the spread rollers from the cassette and also mounts the taking lens and viewfinder components in optical alignment with other optical elements of the camera.

SUMMARY OF THE INVENTION

A highly compact camera having a film cassette disposed below an exit face of a prism that folds the optical path from a taking lens to an uppermost film unit held in the cassette, has a module that forms a lower end portion of the camera and that mounts the camera spread rolls. The module is movable relative to the camera frame between a normally closed position and an open position. In the closed position the module is located adjacent the film exit side of the cassette, and the spread rollers are aligned generally coplanar with the foremost film unit. In the open position, the module is clear of the film cassette, thereby presenting an unobstructed film loading path.

In a preferred form the module mounts the camera taking lens and components of a viewfinder and also mounts processing rollers, the drive mechanism for the rollers and a photocell. In the closed position of such a module, the lens is in optical alignment with the prism and the module mounted components of the viewfinder are in optical alignment with other camera mounted components thereof.

These and other features and objects of the invention will be more fully understood from the following detailed description of a preferred embodiment, which should be read in conjunction with the accompanying drawings.

DETAILED DESCRIPTION OF A PARTICULAR PREFERRED EMBODIMENT

Figure 1:
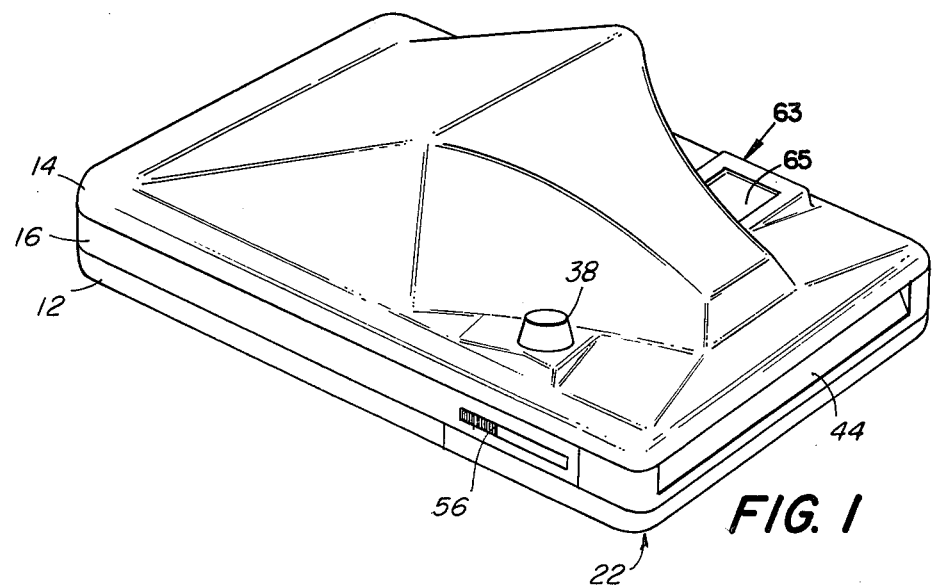
FIG. 1 is a perspective view of a photographic camera incorporating features of the invention.
Figure 2:
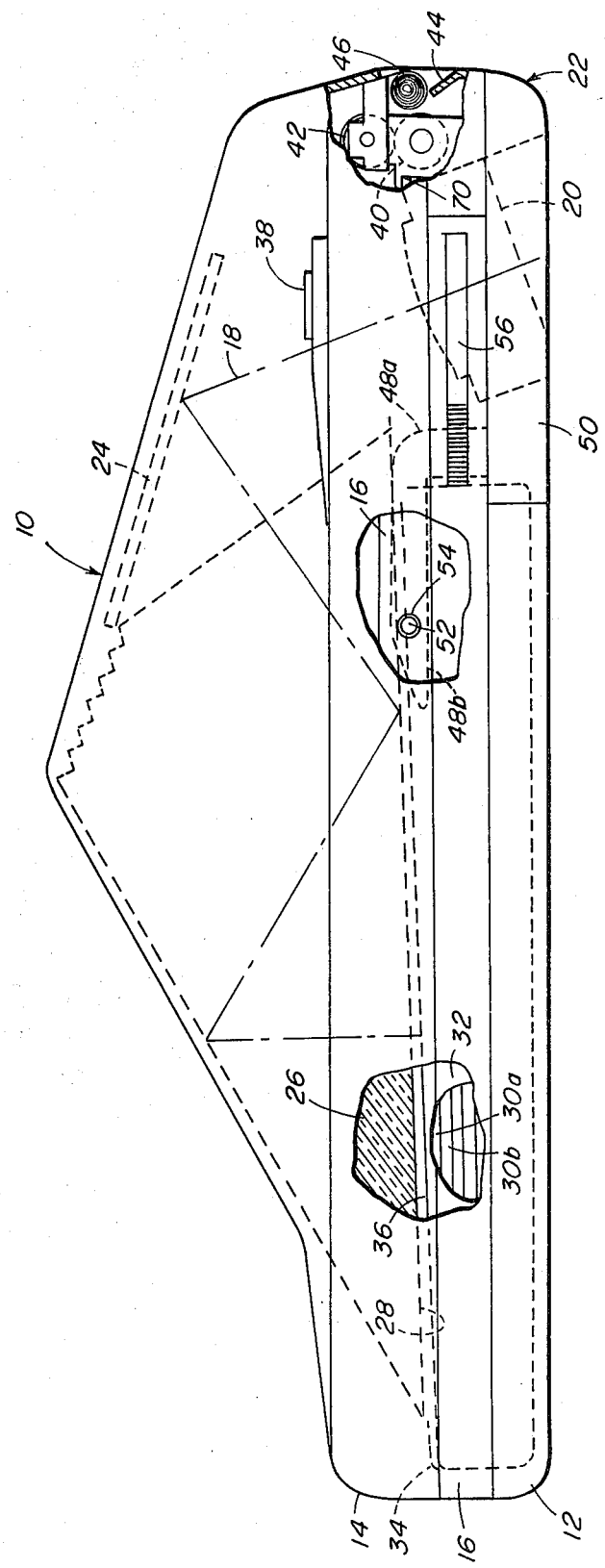
FIG. 2 is a side elevation view, partially broken away, of the camera of FIG. 1.

Referring to FIGS. 1 and 2, a camera 10 of the self-developing type has a body defined by housing segments 12 and 14 and a main frame 16 which mounts the housing segments. As described in detail in the above-noted applications "Compact Prism Camera" and "Compact Self-Developing Camera With Folded Optical Image Path," the camera preferably has a multiply-folded optical path indicated by the principal ray 18. As shown, the optical path is defined by taking lens 20, a mirror 24, and a prism 26. Light exits from prism 26 through a prism exit face 28 that is parallel to, and closely spaced from the photosensitive surface of a film unit 30 disposed at the film plane of the camera.

The film unit 30 is the uppermost of a stack of film units 30, 30a, 30b, ..., disposed in a cassette 32 received in a chamber 34 of the camera. The film units are preferably self-developing units of the type sold by the Polaroid Corporation under the registered designation "SX 70". A window in the cassette's upper wall permits light from the prism to expose the uppermost film unit under the control of shutter release 38. An exposed film unit is advanced, preferably by a system as disclosed in the aforementioned application "Film Advancing System" to the nip of processing rollers 40, 42. A film unit leaving the rollers 40, 42, exits the camera through an exit slot 44 that is masked by a conventional flexible light shield 46. the exposed film unit through the nip in order to initiate formation of the visible image by the spreading of a photoprocessing composition, packaged with the film unit, across photosensitive layers. The rollers also propel the film unit to the camera user through the exit slot 44.

Figure 3:
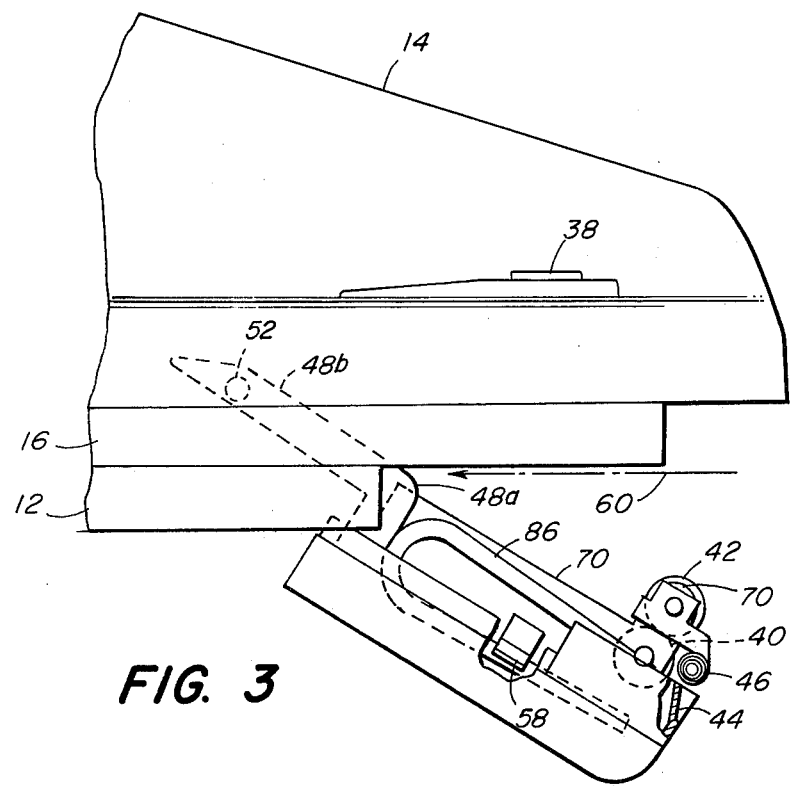
FIG. 3 is a fragmentary view, similar to that of FIG. 2, with the camera open.
Figure 4:
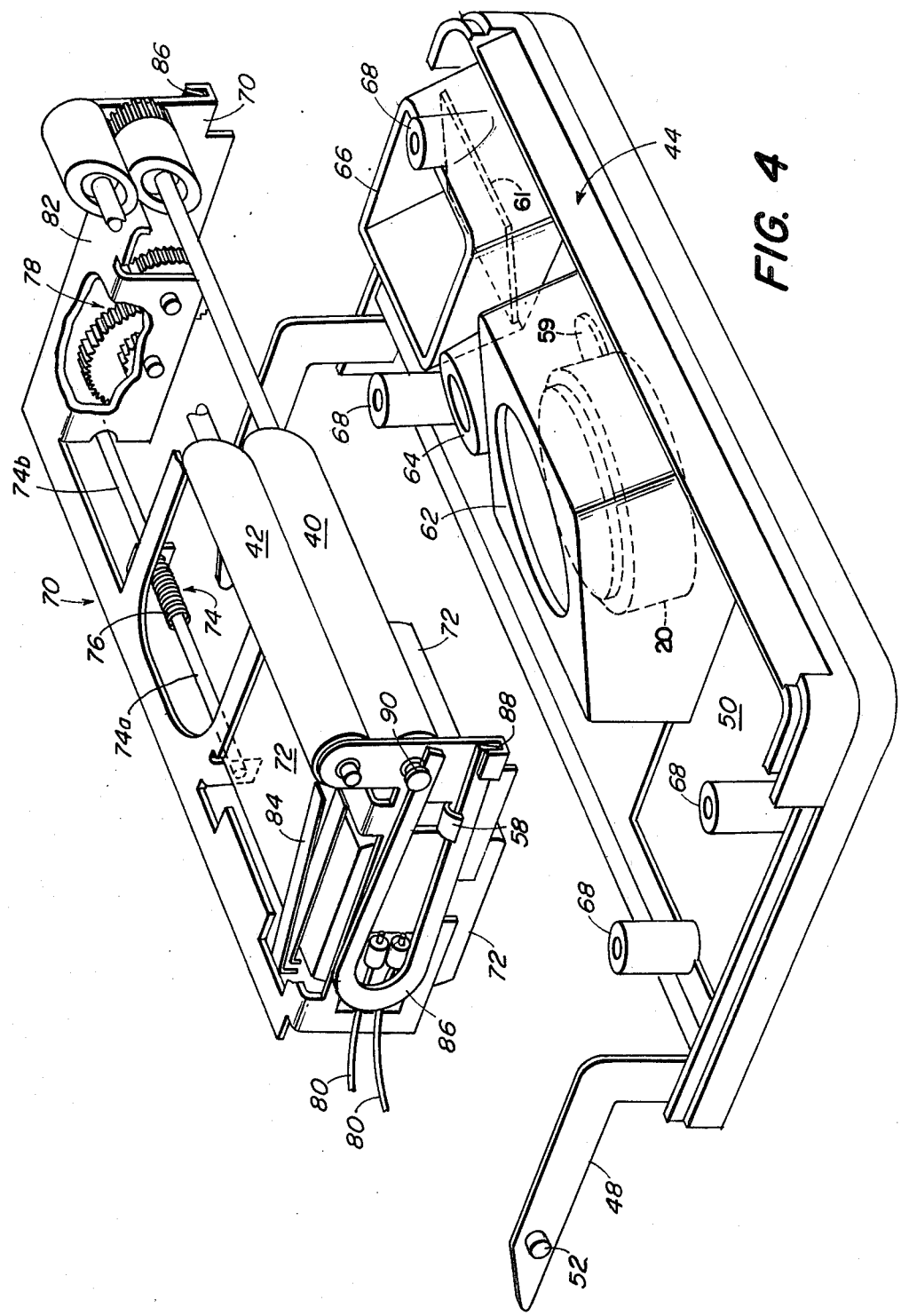
FIG. 4 is an exploded view of the camera module that moves between the two positions shown in FIGS. 2 and 3.

With reference to FIGS. 2-4, a principal feature of the invention is an assemblage or module 22 having an outer support member 50 that forms the lower front end of the camera 10 as shown. The module 22 is positioned directly before the cassette 32 and along the portion of the optical path 18 adjacent the lens 20. The module 22 includes a pair of L-shaped arms 48 having a forward portion 48a secured to the member 50 and a portion 48b extending in a rearward direction towards the cassette 32. A pivot pin 52 secured to each arm portion 48b is journaled in an opening 54 formed in the frame 16. The module 22 pivots about the pins 52 between a normal closed position (FIGS. 1 and 2) and an open position (FIG. 3). A spring loaded latch 56 (FIG. 2) mounted in a slot in the frame 16 engages a tab 58 secured on the module to hold the module in the closed position. The latch 56 can be pivoted manually at the exterior of the camera to disengage it from the tab 58 and thereby allowing the module to swing to its open position.

Referring to FIGS. 3 and 4, the member 50 is preferably formed of a molded plastic that has formed therein receptacles 62, 64 and 66 for receiving and supporting, respectively, the taking lens 20, a photocell 59 (forming part of a conventional exposure control system), and a front element objective lens 61 of a viewfinder 63, an eye lens 65 of the viewfinder being mounted on the camera's housing segment 14 (see FIG. 1). The member 50 also includes integral mounting posts 68 disposed to receive screws (not shown) that secure a roller-supporting frame 70 to the member 50. The camera 10 includes a shutter (not shown) and a capping blade (not shown) for the viewfinder which may take the form of that disclosed in the aforementioned patent application entitled "Selective Closure of Camera Viewfinder and Camera Incorporating Same". The purpose of the capping blade is to preclude light from impinging upon the film unit, as it advances towards the rollers 40 and 42, through the eye lens 65 of the viewfinder 63.

The frame 70 of the module 22 supports both the rollers 40, 42 and a motive system for driving the roller 40 in a clockwise sense as shown in FIGS. 2-4. The motive system includes an electric motor 72, a two-piece drive shaft 74 with a wrap-spring, one-way clutch 76 engaging aligned shaft segments 74a and 74b, and a gear train 78. The clutch 76 allows manual rotation of the driven roller without interference from the motor 72. Flexible electrical leads 80 extend from terminals on motor 72 to battery contact terminals of a battery system (not shown) incorporated in the film cassette 32. Upwardly facing portions 82 of the frame 70 are positioned to guide an exposed film unit to the nip of rollers 40, 42.

A resilient-arm switch 84 is disposed to be closed by a film unit traversing the surface 82. When an exposed film unit is positioned to enter the nip of rollers the switch 84 closes the actuate the motor 72. Springs 82 having a "horseshoe" shape bear against frame tabs 88 and projecting portions of a shaft 90 of the roller 40 to maintain the proper pressure between the rollers 40, 42.

In the open position, the module 22 provides an unobstructed cassette loading and unloading path 60 (FIG. 2). A used cassette is drawn manually out of the camera along the path 60 by gripping a forward portion of the cassette. A fresh cassette is similarly inserted into the camera along the same path until it is seated with the photosensitive surface of its foremost film unit coextensive with and closely spaced from the prism exit face 28. The face 28 is essentially inaccessible to the camera user because the spacing between the prism and the cassette is close, the housing segment 12 defining the cassette receiving chamber 32 is fixed, the loading path 60 is generally parallel to exit face 28, and even with no cassette loaded in the camera the prism exit face is accessible to a user during normal operation through the comparatively small opening afforded by the open module 22. Further even with no cassette loaded and the module 22 open, the portion of the exit face that overlies the film plane is spaced from the open end of the chamber 34. Thus there is little likelihood that the user will touch, abrade or otherwise damage or place foreign substances on the exit face that will degrade the image transmitted by the face 28 to the film.

Also in the closed position of the module, the lens 20 mounted in the receptacle 62 defines a portion of the optical path 18 that traverses the module 22 and crosses both the film loading and processing paths. The compactness of this arrangement, and the ease of access to the lens 20 thus mounted are possible because of the placement of the spread rollers at the forward end of the module remote from the cassette with the lens and its associated portion of the optical path located between the cassette and the spread rollers.

While the invention has been described with respect to a preferred embodiment, various modifications and variations will be apparent to those skilled in the art from the foregoing detailed description and accompanying drawings. Such modifications and variations are intended to fall within the scope of the appended claims.

What is claimed is:

1. A photographic camera of the self-developing type for use with a substantially thin cassette containing a plurality of film units disposed therewithin in a stacked array extending across the thinnest portion of the cassette, the cassette having an exposure aperture overlying a forwardmost film unit, said camera comprising
   A. a housing structure defining an elongated opening through which the cassette can be slidably inserted endwise to position its forwardmost film unit at the focal plane of said camera,
   B. means operative following the exposure of the forwardmost film unit for initiating the advancement of the forwardmost film unit from the cassette in the direction of said elongated opening, and
   C. a cassette loading door module mounted on said housing structure for displacement between a first open position wherein it facilitates the insertion of the cassette into said housing structure through said elongated opening and a second closed position wherein it overlies said elongated opening to facilitate photographic operations of said camera, said module including an outer support member that forms the lower front end of said camera when said module is disposed in its said second position, a frame connected to said outer support member, a pair of processing rollers mounted on said frame to receive therebetween, when said module is disposed in its said second position, the leading edge of the forwardmost film unit as it is advanced from the cassette by said advancement initiating means, a motor mounted on said frame, means mounted on said frame for drivingly connecting at least one of said rollers to said motor and means mounted on said frame for electrically coupling said motor to a battery positioned remote from said module, said electrically coupling means including a switch disposed to be actuated by the leading edge of the advancing forwardmost film unit as it approaches said rollers.

2. A photographic camera of the self-developing type for use with a substantially thin cassette containing a plurality of film units disposed therewithin in a stacked array extending across the thinnest portion of the cassette, the cassette having an exposure aperture overlying a forwardmost film unit, said camera comprising A. a housing structure defining an elongated opening through which the cassette can be slidably inserted endwise to position its forwardmost film unit at the focal plane of said camera, said housing structure including a section which extends in front of and above said elongated opening, B. optical means positioned within said housing structure for receiving focused image carrying light rays and directing them along a folded optical path onto the forwardmost film unit, C. means operative after the exposure of the forwardmost film unit for initiating the advancement of the forwardmost film unit from the cassette in the direction of said elongated opening, and D. a cassette loading door module mounted on said housing structure for displacement between a first open position wherein it facilitates the insertion of the cassette into said housing structure through its said elongated opening and a second closed position wherein it overlies said elongated opening to facilitate photographic operations of said camera, said module including an outer support member that complements said housing structure section to enclose said elongated opening when said module is disposed in its said second position, a pair of processing rollers mounted on said outer support member to receive therebetween, when said module is disposed in its said second position, the leading edge of the forwardmost film unit as it is advanced from the cassette by said advancement initiating means, and a taking lens positioned to be disposed in operative relationship with said optical means when said module is in its said second position.

3. The photographic camera of claim 2 wherein said taking lens is positioned on said module to be disposed intermediate said elongated opening and said rollers when said module is disposed in its said second position.

4. The photograhic camera of claim 2 wherein said module additionally includes a photocell adapted to form part of an exposure control system.

5. The photographic camera of claim 2 wherein said module additionally includes at least one optical element of a viewfinder.

6. The photographic camera of claim 3 wherein said module additionally includes at least one optical element of a viewfinder positioned on said module to be disposed intermediate said elongated slot and said rollers when said module is in its second position.

7. The photographic camera of claim 2 wherein said housing structure section includes at least one optical element of a viewfinder and said module additionally includes at least one optical element of a viewfinder positioned on said module to be disposed in operative relationship with said one optical element on said housing structure section when said module is in its said second position.

8. The photographic camera of claim 7 wherein said optical element on said housing structure section is a viewfinder eye lens and said one viewfinder optical elememt on said module is a front element objective lens.

9. A photographic camera of the self-developing type for use with a substantially thin cassette containing a plurality of film units disposed therewithin in a stacked array extending across the thinest portion of the cassette, the cassette having an exposure aperture overlying a forwardmost film unit, said camera comprising A. a housing structure defining an elongated opening through which the cassette can be slidably inserted endwise to postion its forwardmost film unit at the focal plane of said camera, B. means operative after the exposure of the foerwardmost film unit for initiating the advancement of the forwardmost film unit from the cassette in the direction of said elongated opening, and C. A cassette loading door module mounted on said housing structure for displacement between a first open position wherein it facilitates the insertion of the cassette into said housing structure through its said elongated opening and a second closed position wherein it overlies said elongated opening to facilitate photographic operations of said camera, said module including a pair of processing rollers mounted to receive therebetween, when said module is disposed in its said second position, the leading edge of the forwardmost film unit as it is advanced from the cassette by said advancement initiating means, and at least one optical element of a viewfinder located to be disposed in its operative position when said module is disposed in its said second position.

10. The photographic camera of claim 9 wherein said housing structure includes a section which extends in front of and above said elongated opening and said module includes an outer support member that complements said housing structure section to enclose said elongated opening when said module is in its said second position, and additionally including at least one other optical element of said viewfinder mounted on said housing structure section to be operably aligned with said optical viewfinder element on said module when said module is in its said second position.

11. The photographic camera of claim 10 wherein said optical viewfinder element on said module is located to be disposed intermediate said elongated opening and said rollers when said module is in its said second position.

* * * * *